United States Patent
Laborczfalvi

(10) Patent No.: US 11,822,872 B2
(45) Date of Patent: Nov. 21, 2023

(54) RENDERING BASED ON A DOCUMENT OBJECT MODEL

(71) Applicant: Citrix Systems, Inc., Fort Lauderdale, FL (US)

(72) Inventor: Lee Laborczfalvi, Freiburg (DE)

(*) Notice: Subject to any disclaimer, the term of this patent is extended or adjusted under 35 U.S.C. 154(b) by 0 days.

(21) Appl. No.: 16/938,229

(22) Filed: Jul. 24, 2020

(65) Prior Publication Data

US 2020/0356721 A1    Nov. 12, 2020

Related U.S. Application Data

(62) Division of application No. 15/045,558, filed on Feb. 17, 2016, now Pat. No. 10,769,351.

(60) Provisional application No. 62/158,695, filed on May 8, 2015.

(51) Int. Cl.
| | |
|---|---|
| G06F 40/14 | (2020.01) |
| G06F 40/154 | (2020.01) |
| G06F 40/103 | (2020.01) |
| G06F 9/44 | (2018.01) |
| G06F 40/143 | (2020.01) |

(52) U.S. Cl.
CPC .............. *G06F 40/154* (2020.01); *G06F 9/44* (2013.01); *G06F 40/103* (2020.01); *G06F 40/143* (2020.01)

(58) Field of Classification Search
None
See application file for complete search history.

(56) References Cited

U.S. PATENT DOCUMENTS

| | | | |
|---|---|---|---|
| 5,202,971 A | 4/1993 | Henson et al. | |
| 7,219,299 B2 | 5/2007 | Fields et al. | |
| 7,308,648 B1 | 12/2007 | Buchthal et al. | |
| 7,669,183 B2* | 2/2010 | Bowman | G06F 16/986 717/113 |
| 7,958,232 B1* | 6/2011 | Colton | H04L 67/565 709/224 |
| 8,108,763 B2* | 1/2012 | Gao | G06F 40/103 715/752 |
| 8,239,939 B2 | 8/2012 | Dunagan et al. | |
| 8,332,763 B2 | 12/2012 | Zhang et al. | |
| 8,375,296 B2 | 2/2013 | Kalasapur et al. | |
| 8,413,047 B2 | 4/2013 | Vick et al. | |
| 8,489,605 B2 | 7/2013 | Ayoub et al. | |
| 8,510,237 B2 | 8/2013 | Cascaval et al. | |

(Continued)

OTHER PUBLICATIONS

Jun. 3, 2021—U.S. Non-final Office Action—U.S. Appl. No. 16/938,162.

(Continued)

*Primary Examiner* — Maikhanh Nguyen

(57) ABSTRACT

Methods and devices for rendering content are described herein. In some embodiments, the method may include receiving an email or other markup language based content. The method may create a document object model (DOM) corresponding to the content using an off screen browser. The method may cause the off screen browser to indicate that the DOM has been created before the off screen browser retrieves any external content. The method may extract a portion of the content from the DOM, and then render the portion of the content using predefined formatting rules.

18 Claims, 7 Drawing Sheets

(56) References Cited

U.S. PATENT DOCUMENTS

| | | | |
|---|---|---|---|
| 8,639,743 B1* | 1/2014 | Colton | G06F 9/45525 |
| | | | 709/224 |
| 8,700,763 B2 | 4/2014 | Mackey | |
| 8,732,830 B2 | 5/2014 | Wibbeler | |
| 8,959,628 B2 | 2/2015 | Coppock | |
| 9,049,222 B1 | 6/2015 | He et al. | |
| 9,076,147 B2* | 7/2015 | Khoo | G06Q 30/0251 |
| 9,317,485 B2* | 4/2016 | Dent | G06Q 10/107 |
| 9,374,369 B2 | 6/2016 | Mahaffey et al. | |
| 9,378,199 B2 | 6/2016 | Vick et al. | |
| 9,507,759 B2 | 11/2016 | Gao et al. | |
| 9,524,531 B2 | 12/2016 | Byrne et al. | |
| 9,753,699 B2 | 9/2017 | Chartier et al. | |
| 9,792,265 B2* | 10/2017 | Bourke | G06F 16/986 |
| 9,798,524 B1* | 10/2017 | Colton | G06F 16/972 |
| 10,050,849 B1* | 8/2018 | Long | H04L 43/04 |
| 10,452,653 B2* | 10/2019 | Alison | H04L 67/10 |
| 2002/0033844 A1 | 3/2002 | Levy et al. | |
| 2002/0113819 A1 | 8/2002 | Baer et al. | |
| 2002/0116495 A1 | 8/2002 | Hutten | |
| 2004/0049737 A1 | 3/2004 | Simon Hunt et al. | |
| 2004/0061713 A1 | 4/2004 | Jennings | |
| 2005/0022116 A1 | 1/2005 | Bowman et al. | |
| 2005/0108639 A1 | 5/2005 | Fields et al. | |
| 2007/0016949 A1 | 1/2007 | Dunagan et al. | |
| 2007/0038718 A1 | 2/2007 | Khoo et al. | |
| 2007/0107057 A1 | 5/2007 | Chander et al. | |
| 2007/0113282 A1 | 5/2007 | Ross | |
| 2007/0136811 A1 | 6/2007 | Gruzman et al. | |
| 2007/0143672 A1 | 6/2007 | Lipton et al. | |
| 2007/0226314 A1 | 9/2007 | Eick et al. | |
| 2007/0226612 A1* | 9/2007 | Sun | G06F 16/9577 |
| | | | 715/210 |
| 2007/0256003 A1* | 11/2007 | Wagoner | G06F 16/958 |
| | | | 707/E17.116 |
| 2008/0178073 A1* | 7/2008 | Gao | G06F 40/103 |
| | | | 715/752 |
| 2008/0195932 A1 | 8/2008 | Oikawa et al. | |
| 2009/0217241 A1 | 8/2009 | Motoyama et al. | |
| 2009/0248707 A1* | 10/2009 | Mehta | G06F 16/986 |
| 2010/0058293 A1 | 3/2010 | Dunagan et al. | |
| 2010/0095208 A1 | 4/2010 | White et al. | |
| 2010/0223664 A1 | 9/2010 | Naranjo et al. | |
| 2010/0235456 A1 | 9/2010 | Uchiyama et al. | |
| 2010/0257603 A1 | 10/2010 | Chander et al. | |
| 2010/0287566 A1* | 11/2010 | Hauser | G06F 9/542 |
| | | | 719/318 |
| 2010/0313149 A1 | 12/2010 | Zhang et al. | |
| 2011/0252381 A1 | 10/2011 | Chaudhri | |
| 2012/0023416 A1* | 1/2012 | Khoo | H04L 51/046 |
| | | | 715/752 |
| 2012/0066583 A1 | 3/2012 | Priestley et al. | |
| 2012/0110437 A1 | 5/2012 | Pan et al. | |
| 2012/0239598 A1 | 9/2012 | Cascaval et al. | |
| 2012/0290924 A1* | 11/2012 | Vick | G06F 40/221 |
| | | | 715/237 |
| 2012/0290945 A1 | 11/2012 | Byrne et al. | |
| 2013/0024763 A1 | 1/2013 | Nemati et al. | |
| 2013/0139050 A1 | 5/2013 | Gao et al. | |
| 2013/0179771 A1* | 7/2013 | Dent | G06F 40/103 |
| | | | 715/234 |
| 2014/0033276 A1 | 1/2014 | Wibbeler | |
| 2014/0053064 A1* | 2/2014 | Weber | G06F 40/103 |
| | | | 715/235 |
| 2014/0075282 A1 | 3/2014 | Shah et al. | |
| 2014/0101539 A1* | 4/2014 | Ma | G06F 40/143 |
| | | | 715/235 |
| 2014/0122998 A1 | 5/2014 | Shin | |
| 2014/0189808 A1 | 7/2014 | Mahaffey et al. | |
| 2014/0325343 A1 | 10/2014 | Rao | |
| 2014/0325344 A1* | 10/2014 | Bourke | G06F 40/166 |
| | | | 715/234 |

OTHER PUBLICATIONS

Mar. 21, 2022—U.S. Non-final Office Action—U.S. Appl. No. 16/938,162.

* cited by examiner

```
<script>
    document.addEventListener("DOMContentLoaded", function(event)
    {
        window.stop();
    });
</script>
```

*FIG. 7*

```
- (void) webView:  (WKWebView *) webView
 didFailNavigation: (WKNavigation *)navigation
 withError: (NSError *)error
{
    if(error.code == kCFURLErrorCancelled)
    {
        LOG(INFO,@"Load aborted by JS – DOM is now ready");
        [self webViewDomDidBecomeReady:webView];
    }
}
```

*FIG. 8*

RENDERING BASED ON A DOCUMENT OBJECT MODEL

CROSS-REFERENCE TO RELATED APPLICATIONS

This application is a divisional of and claims priority to U.S. patent application Ser. No. 15/045,558, filed Feb. 17, 2016, and entitled "Rendering Based on a Document Object Model," which claims priority to U.S. Provisional Patent Application No. 62/158,695, filed May 8, 2015, and entitled "Email Rendering Based on a Document Object Model," both of which are incorporated herein by reference in their entirety.

FIELD

Aspects described herein generally relate to rendering content for display by a computing device. More specifically, aspects described herein relate to pre-generating a Document Object Model (DOM) for content to expedite the rendering process.

BACKGROUND

An email or portions of an email may be received in a HyperText Markup Language (HTML) format. Conventional systems, when rendering the email, render portions twice. The email may first be rendered with styles or scripts that are included in the HTML email. When rendering the email, external content such as images may be downloaded. After retrieving all the content and rendering the email once, the system may apply a custom style or script to the HTML email, and the email may be rendered a second time with the system's desired formatting. The external content may be downloaded a second time as well. Rendering twice and downloading external content twice is inefficient. Further, displaying the email both times that it is rendered may present a flickering effect or changing the display to a user. Similar problems are encountered with non-email content as well.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards rendering content using a document object model.

Aspects of the disclosure relate to various techniques and technologies for a method for rendering content for display. In one implementation, the method may include receiving HTML-based content. The method may create a document object model (DOM) corresponding to the content using an off screen browser. The method may cause the off screen browser to indicate that the DOM has been created before the off screen browser retrieves any external content. The method may extract a portion of the content from the DOM, and render the portion of the content using predefined formatting rules.

Aspects of the disclosure also relate to various techniques and technologies for a method for rendering an email. In one implementation, the method may include adding a script to an email. The script is configured to prevent a web browser from retrieving external content linked within the email. The method may load the email using the web browser to generate a DOM corresponding to the email. The method may also render the email based on the DOM.

Aspects of the disclosure also relate to various techniques and technologies for a method for rendering a document having markup language content. The method may include invoking a first web browser to generate a DOM based on the markup language content. The generating is performed without downloading external content by the first web browser. The method may extract style-neutral content from the DOM. The method may apply a style to the style-neutral content. The method may also render the style-neutral content based on the applied style using a second web browser.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7 illustrates an example of a script that may stop pending network requests according to one or more illustrative aspects described herein.

FIG. 8 illustrates an example of a script that may issue a detectable error code according to one or more illustrative aspects described herein.

DETAILED DESCRIPTION

In the following description of the various embodiments, reference is made to the accompanying drawings identified above and which form a part hereof, and in which is shown, by way of illustration, various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
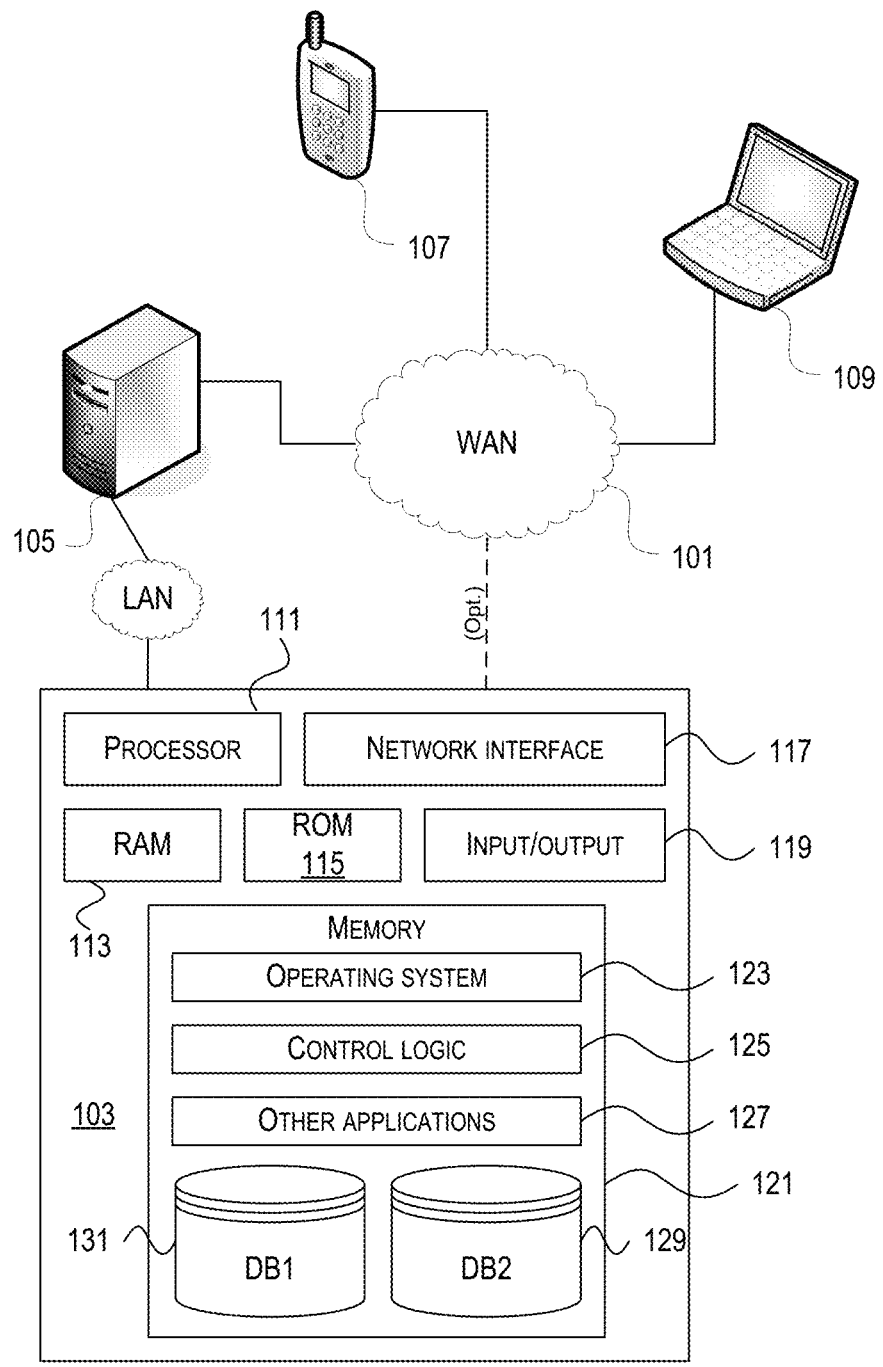
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MANs), wireless networks, personal area networks (PANs), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
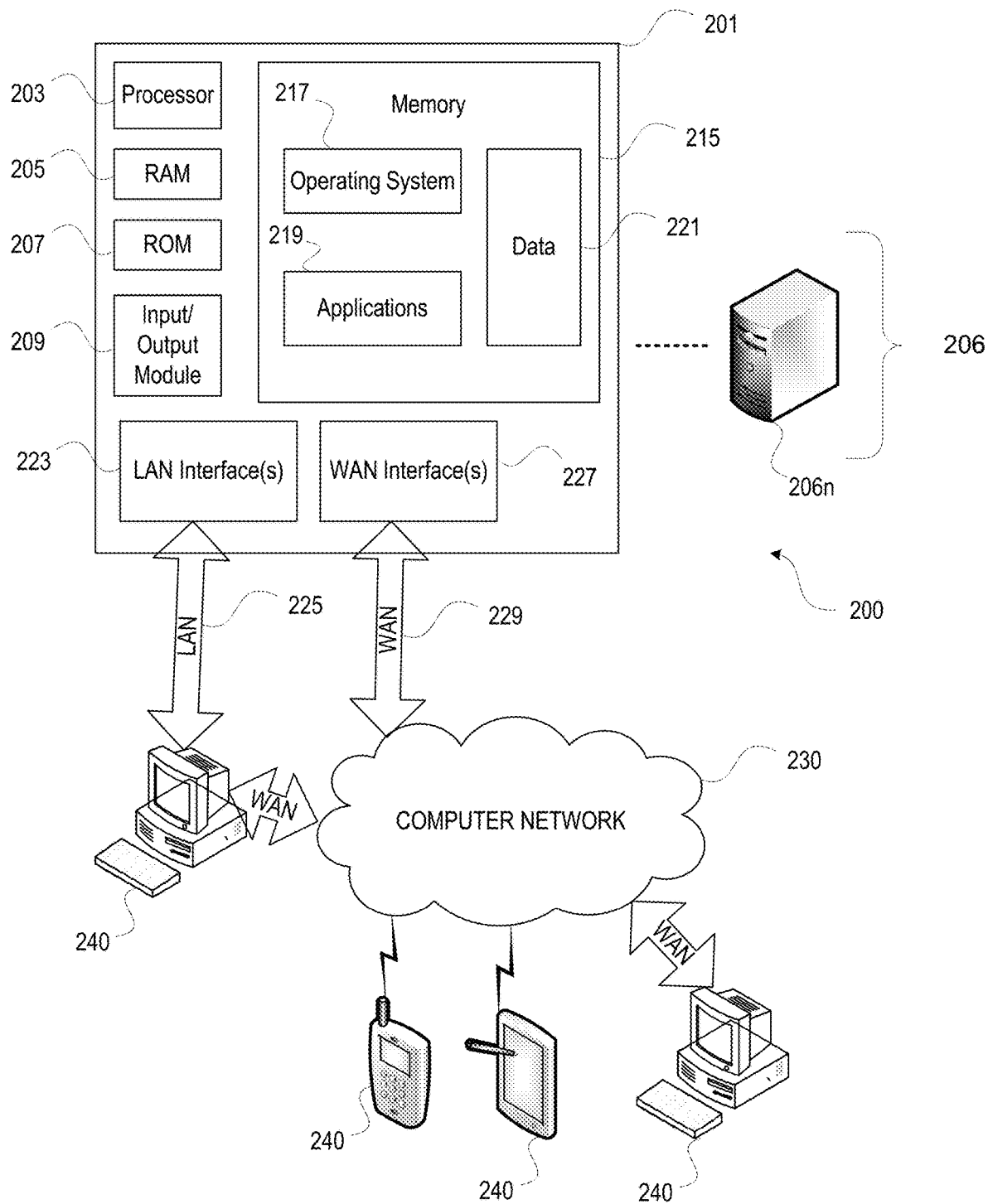
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Generating a Document Object Model

Figure 3:
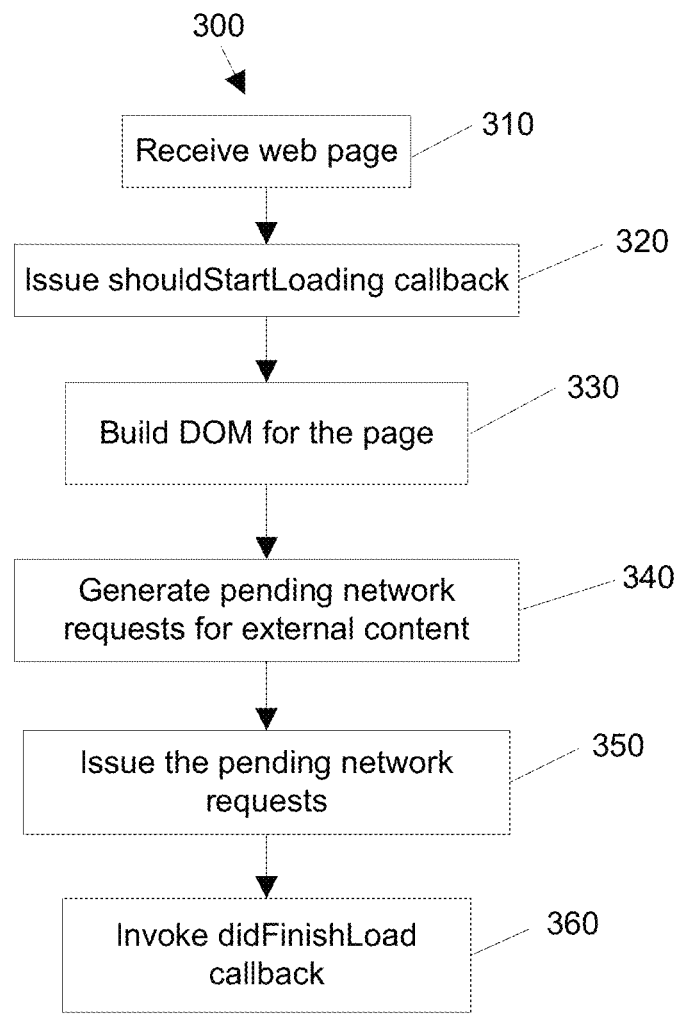
FIG. 3 illustrates a method and data flow for generating a Document Object Model (DOM) and loading external content according to one or more illustrative aspects described herein.

FIG. 3 illustrates a method 300 of data flow for generating a Document Object Model (DOM) and loading external content according to one or more illustrative aspects described herein. When displaying an HTML web page, a web browser will generate a DOM using a method similar to method 300.

At step 310, a web page or a selection of a web page to load is received. For example, a user or a program may enter a URL of a web page into a web browser. At step 320, a "shouldStartLoading" or platform equivalent callback may be issued to verify that the page load should begin. If a verification that the page load should begin is received, the method 300 may proceed to step 330.

At step 330, a DOM for the page received at step 310 may be generated, e.g., by the browser engine. At step 340, pending network requests for external content may be generated based on the DOM. The browser may scan the DOM to determine external content linked to in the page, such as images or scripts, and generate a list of pending network requests for the external content.

At step 350, the pending network requests may be issued. By issuing the pending network requests, the external content may be retrieved. During execution, this step may consume a relatively large portion of the time and resources used by method 300. For example, step 350 may take longer to perform than the other steps in method 300. At step 360, a "didFinishLoad" callback may be issued, indicating that the web page has been loaded.

Typically, after the "didFinishLoad" callback, the DOM will be available for retrieval by an external application. For example, the DOM may be retrieved using a browser developer tools feature of a web browser.

Generating a Document Object Model without Loading External Content

Aspects described herein may be used to render any content that benefits from an HTML document object model (DOM) being pre-rendered. While aspects described herein are discussed in the context of an email client, the features herein may also be used with other types of content that rely on an HTML DOM for rendering. This may include, without limitation, any application that supports HTML format documents to which the application may want to apply custom styles. For example, an application that is used to show notes taken in another application may want to apply its own styles to the notes that it receives in HTML format, and may therefore benefit from aspects described herein.

An email client may use one or more web browsers to render and/or display HTML content in emails. The email client may apply a set of uniform styles to the HTML before displaying the HTML. The email client may prevent JavaScript in the email from executing, including JavaScript contained in Cascading Style Sheets (CSS). For example, the email client may prevent JavaScript from executing for security reasons. Additionally, the email client may remove content from HTML in an email. To apply styles, prevent JavaScript from executing, or remove content, the email client may interpret, or parse, the HTML in the email.

Figure 6:
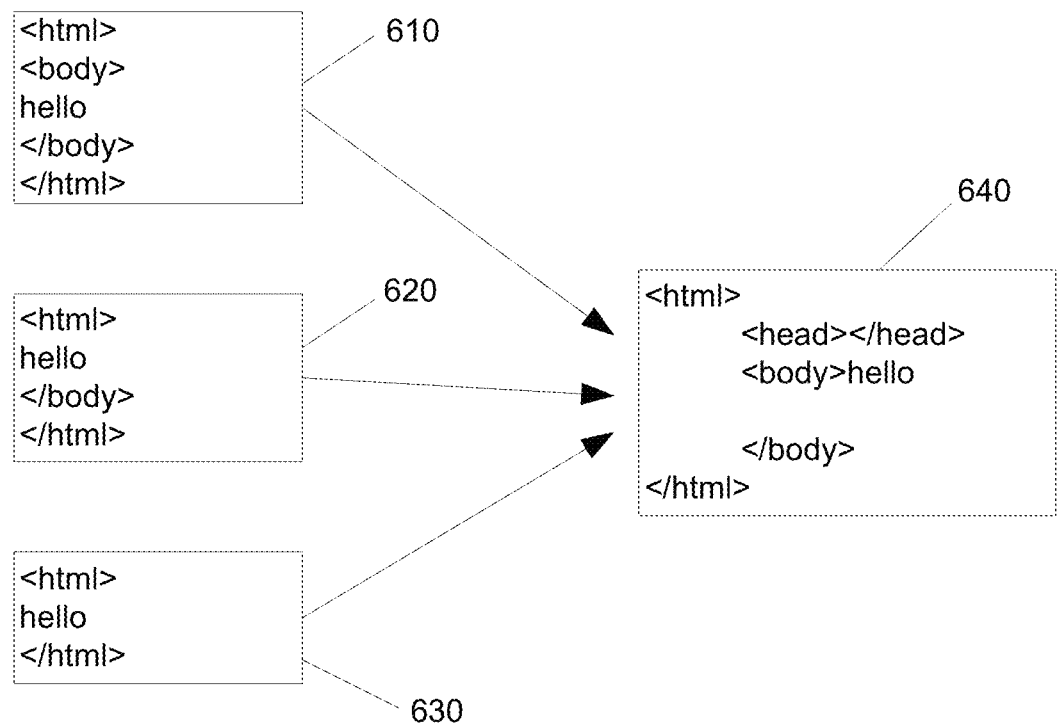
FIG. 6 depicts examples of HTML and a corresponding DOM according to one or more illustrative aspects described herein.

Interpreting HTML documents using regular expressions may be difficult due to variations in HTML tags. FIG. 6 illustrates examples of variations in HTML tags. HTML is an irregular language, and thus may be difficult to parse consistently using regular expressions. A DOM corresponding to an HTML document may be more consistent, or regular, than the original HTML document.

As described in FIG. 3, a DOM may be generated by a web browser loading an HTML document. Although a DOM may be constructed prior to the browser retrieving external content, typically, the DOM is only available after the external content has been retrieved. In certain instances, it may be desirable to retrieve the DOM prior to or without the browser issuing the list of pending network requests for external content at step 350. Issuing the list of pending network requests at step 350 may be time consuming. For example, loading external resources while generating a DOM may cause delays. For certain applications, it may be preferable to generate a DOM without performing the actions described at step 350. By performing method 300 without step 350, a DOM may be generated without issuing pending network requests.

In certain implementations, email clients may display an HTML email twice. First, the web page generated by a browser creating the DOM is displayed, and then, a web page generated using the DOM and custom styles or scripts is displayed. This may result in a flickering, or changing, display. Displaying an HTML email once rather than twice results in a user interface without flickering or changing emails, thereby providing an improved user experience.

Figure 4:
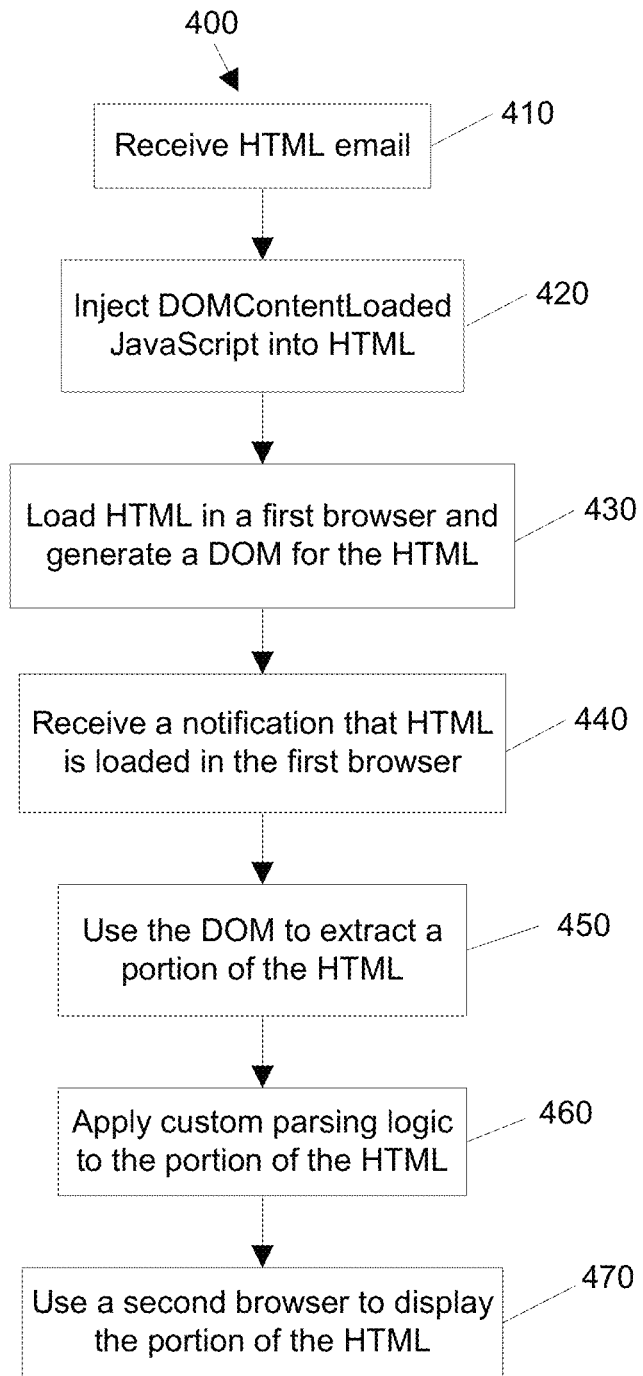
FIG. 4 illustrates a method and data flow for displaying a Hyper Text Markup Language (HTML) email according to one or more illustrative aspects described herein.

FIG. 4 illustrates a method and data flow 400 for displaying an HTML email according to one or more illustrative aspects described herein. At step 410, an HTML email may be received, selected, or opened. For example, a user may select an HTML email to view at step 410. Although step 410 describes an HTML email, any HTML document may be received at step 410. Additionally, documents in another markup language may be received at step 410. For example, an extensible hypertext markup language (XHTML) document may be received at step 410. Other markup languages for which a DOM or similar construct can be generated may also be used.

At step 420, script may be injected, or inserted, in the HTML email received at step 410. The script may prevent a browser loading the HTML email from downloading external content. For example, the script may cause the browser to stop any pending network requests. In one implementation, the script may be a JavaScript DOMContentLoaded event handler that causes the browser to call a "window.stop( )" function. FIG. 7, described below, illustrates an example of a script that may be injected at step 420.

At step 430, the HTML email with the injected script may be loaded in a first browser. An indication that parsing is underway may be issued. For example, a value may be returned indicating that parsing is underway. The first browser may then generate a DOM corresponding to the HTML email. For example, portions of method 300 may be used to generate the DOM. FIG. 6, described below, illustrates examples of disparate HTML documents and a corresponding common DOM that is created based on each.

The first browser may be an off-screen browser, which may be referred to as a headless HTML parser. For example, the first browser might not be displayed on a screen, have a user interface, or be viewable by a user. The first browser may be a background application. The injected script may cause the browser to cancel any network requests for external content that are issued while generating the DOM.

Figure 5:
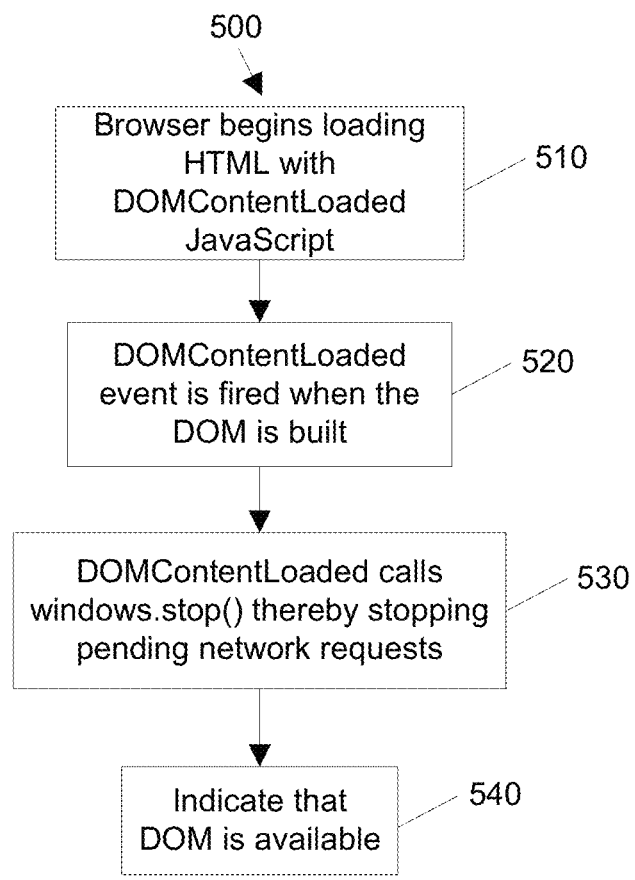
FIG. 5 illustrates a method and data flow for creating a DOM according to one or more illustrative aspects described herein.

FIG. 5 illustrates a method and data flow 500 for creating a DOM according to one or more illustrative aspects described herein. In one implementation, method 500 may be executed at step 430 of method 400. In this implementation, method 400 and method 500 may execute asynchronously, or portions of method 400 and portions of method 500 may execute asynchronously.

At step 510, the first browser begins loading an HTML document with JavaScript. In one implementation, the JavaScript may respond to a DOMContentLoaded event. An example of JavaScript that may be contained in an HTML document is described below in FIG. 7. Although step 510 describes an HTML document with JavaScript, other types of script may be used to perform method 500.

At step 520, the first browser may begin generating a DOM corresponding to the HTML document. When the first browser is generating the DOM, the browser may fire, or execute, the DOMContentLoaded event. The event may be fired during the DOM rendering process when the DOM has been assembled into an object model and before network requests have been made. For example, if the first browser is generating a DOM using method 300, the DOMContentLoaded event may be fired between steps 340 and 350.

At step 530, the DOMContentLoaded event causes a function to be called that stops the first browser from loading external content. For example, a "windows.stop( )" function may be called to stop further processing of the HTML by the first browser while leaving the DOM intact. In this example, when the "windows.stop( )" function is called, pending network requests may be canceled and the DOM tree may be available.

At step 540, the first browser may indicate that the DOM is available. For example, the first browser may invoke an error delegate with a cancelled error code. FIG. 8, described below, illustrates an example of a script that may cause an error code to be issued when the DOM is available.

Returning to method 400, at step 440, a notification may be received that the HTML email has been loaded in the first browser. The notification may indicate that the DOM generated at step 430 is available for retrieval. For example, if an email client loads an HTML email message in the first browser, the first browser may transmit a message to the email client indicating that the DOM is available. In one implementation, a completion block received through an Application Program Interface (API) may be used to indicate that the DOM is available.

At step 450, the DOM generated by the first browser may be used to extract a portion of the HTML in the HTML email, or a portion of the DOM. For example, HTML that is between the "body" tags in the DOM may be extracted. CSS or JavaScript content contained within the HTML email received at step 410 might not be included in the extracted HTML. For example, if CSS code is included in a header of the HTML email received at step 410, the CSS code might not be included in the extracted HTML. The extracted content may be style-neutral insofar as it may comprise text or other content without any formatting.

At step 460, custom parsing logic may be applied to the HTML extracted at step 450. For example, a CSS stylesheet or other predefined formatting rules may be applied to the HTML extracted at step 450. An email client may use custom CSS to display emails with consistent formatting. By removing CSS included in an HTML email at step 450, the email client may be able to apply the custom CSS to the HTML email. After the custom parsing and processing is completed, a completion callback may be invoked.

At step 470, a second browser may display the portion of the HTML extracted at step 450 with the custom parsing logic applied at step 460. All or portions of the second browser may be displayed. For example, an email client may use the second browser to display the HTML that is generated at step 460. In one implementation, the first browser and the second browser may be the same browser, or multiple instances of a browser.

Portions of method 400 may be implemented using an API. For example, an API may receive an HTML document or email, receive logic to apply to the HTML document, such as CSS, and receive a completion block to invoke after parsing of the HTML document is completed.

FIG. 6 depicts examples of HTML and a corresponding DOM according to one or more illustrative aspects described herein. HTML examples 610, 620, and 630 are examples of HTML that may be used to form a webpage with the text "hello." HTML 610 includes both opening and closing body tags. HTML 620 includes a closing body tag without an opening body tag. HTML 630 includes neither an opening nor a closing body tag. Although HTML examples 610, 620, and 630 all include different tags, a DOM 640 corresponding to examples 610, 620, and 630 is the same.

As described above, interpreting HTML documents using regular expressions may be difficult due to variations in HTML tags. In FIG. 6, the body of the HTML examples 610, 620, and 630 comprises the text "hello," but the text is surrounded by different tags in the examples. Regardless of whether or not tags are missing in 610, 620, or 630, the DOM 640 comprises the text "hello" between an opening and closing body tag. Parsing a DOM, or applying logic to the DOM, may result in more consistency than directly parsing HTML.

FIG. 7 illustrates an example of a script that may stop pending network requests according to one or more illustrative aspects described herein. The script in FIG. 7 may be inserted into an HTML document to prevent a browser loading the HTML document from requesting external content. In the code in FIG. 7, a "window.stop( )" command may be issued when a "DOMContentLoaded" event is detected. The "window.stop( )" command may cause the browser to stop or cancel any pending network requests related to the HTML document.

FIG. 8 illustrates an example of a script that may issue a detectable error code according to one or more illustrative aspects described herein. The script illustrated in FIG. 8 may be used to detect that DOM content is available on iOS. The script may cause an error code to be issued in response to a load cancellation. After receiving the error code, further requests may be issued to parse the DOM. For example, JavaScript requests may be used to parse the DOM. Other platforms, such as Android, may provide a different interface for detecting a browser load completion event.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   creating, using an off-screen browser, a document object model (DOM) corresponding to a markup language document;
   prior to the off-screen browser issuing network requests for retrieving content referred to within the markup language document, causing the off-screen browser to indicate that loading of the DOM is complete and the DOM is available;
   extracting, from the DOM and based on the indication that loading of the DOM is complete and the DOM is available, only a body portion of the markup language document, wherein:
   the body portion of the markup language document is rendered using predefined formatting rules comprising one or more style sheets, and
   the one or more style sheets are one or more custom style sheets used by an application in which the body portion of the markup language document is rendered, wherein the one or more custom style sheets are different from a style sheet referred to in the markup language document; and
   rendering the body portion of the markup language document.

2. The method of claim 1, wherein the one or more style sheets are custom style sheets used by an email client application.

3. The method of claim 1, further comprising:
   prior to creating the DOM, adding a script to the markup language document,
   wherein causing the off-screen browser to indicate that loading of the DOM is complete and the DOM is available comprises:
   executing the script added to the markup language document, wherein the script is configured to receive an indication when loading of the DOM is complete; and
   in response to receiving the indication, causing the off-screen browser to indicate that the DOM is available.

4. The method of claim 1, wherein a script added to the markup language document causes the off-screen browser to cancel, while creating the DOM, the network requests for retrieving the content referred to within the markup language document.

5. The method of claim 1, wherein causing the off-screen browser to indicate that loading of the DOM is complete and the DOM is available comprises causing the off-screen browser to indicate that loading of the DOM is complete and the DOM is available by causing the off-screen browser to issue an error.

6. The method of claim 1, wherein the body portion of the markup language document is rendered in an on-screen browser different from the off-screen browser.

7. A computing device comprising:
   a processor; and
   memory storing computer-readable instructions that, when executed by the processor, cause the computing device to:
   create, using an off-screen browser, a document object model (DOM) corresponding to a markup language document;
   prior to the off-screen browser issuing network requests for retrieving content referred to within the markup language document, cause the off-screen browser to indicate that loading of the DOM is complete and the DOM is available;
   extract, from the DOM and based on the indication that loading of the DOM is complete and the DOM is available, only a body portion of the markup language document, wherein:

the body portion of the markup language document is rendered using predefined formatting rules comprising one or more style sheets, and the one or more style sheets are one or more custom style sheets used by an application in which the body portion of the markup language document is rendered, wherein the one or more custom style sheets are different from a style sheet referred to in the markup language document; and render the body portion of the markup language document.

8. The computing device of claim 7, wherein the one or more style sheets are custom style sheets used by an email client application.

9. The computing device of claim 7, wherein the instructions further cause the computing device to:

prior to creating the DOM, add a script to the markup language document, and wherein the instructions cause the computing device to cause the off-screen browser to indicate that loading of the DOM is complete and the DOM is available by:

executing the script added to the markup language document, wherein the script is configured to receive an indication when loading of the DOM is complete; and in response to receiving the indication, causing the off-screen browser to indicate that the DOM is available.

10. The computing device of claim 7, wherein a script added to the markup language document causes the off-screen browser to cancel, while creating the DOM, the network requests for retrieving the content referred to within the markup language document.

11. The computing device of claim 7, wherein the instructions cause the computing device to cause the off-screen browser to indicate that loading of the DOM is complete and the DOM is available by causing the off-screen browser to issue an error.

12. The computing device of claim 7, wherein the body portion of the markup language document is rendered in an on-screen browser different from the off-screen browser.

13. One or more non-transitory computer-readable media storing instructions that, when executed by a computing system comprising at least one processor, a communication interface, and memory, cause the computing system to:

create, using an off-screen browser, a document object model (DOM) corresponding to a markup language document;

prior to the off-screen browser issuing network requests for retrieving content referred to within the markup language document, cause the off-screen browser to indicate that loading of the DOM is complete and the DOM is available;

extract, from the DOM and based on the indication that loading of the DOM is complete and the DOM is available, only a body portion of the markup language document, wherein:

the body portion of the markup language document is rendered using predefined formatting rules comprising one or more style sheets, and the one or more style sheets are one or more custom style sheets used by an application in which the body portion of the markup language document is rendered, wherein the one or more custom style sheets are different from a style sheet referred to in the markup language document; and render the body portion of the markup language document.

14. The one or more non-transitory computer-readable media of claim 13, wherein the one or more style sheets are custom style sheets used by an email client application.

15. The one or more non-transitory computer-readable media of claim 13, further comprising:

prior to creating the DOM, adding a script to the markup language document, wherein causing the off-screen browser to indicate that loading of the DOM is complete and the DOM is available comprises:

executing the script added to the markup language document, wherein the script is configured to receive an indication when loading of the DOM is complete; and in response to receiving the indication, causing the off-screen browser to indicate that the DOM is available.

16. The one or more non-transitory computer-readable media of claim 13, wherein a script added to the markup language document causes the off-screen browser to cancel, while creating the DOM, the network requests for retrieving the content referred to within the markup language document.

17. The one or more non-transitory computer-readable media of claim 13, wherein causing the off-screen browser to indicate that loading of the DOM is complete and the DOM is available comprises causing the off-screen browser to indicate that loading of the DOM is complete and the DOM is available by causing the off-screen browser to issue an error.

18. The one or more non-transitory computer-readable media of claim 13, wherein the body portion of the markup language document is rendered in an on-screen browser different from the off-screen browser.

* * * * *